US010789397B2

(12) United States Patent
Ventroux

(10) Patent No.: US 10,789,397 B2
(45) Date of Patent: Sep. 29, 2020

(54) COMPUTER-IMPLEMENTED METHOD OF PERFORMING PARALLELIZED ELECTRONIC-SYSTEM LEVEL SIMULATIONS

(71) Applicant: COMMISSARIAT A L'ENERGIE ATOMIQUE ET AUX ENERGIES ALTERNATIVES, Paris (FR)

(72) Inventor: Nicolas Ventroux, Massy (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 360 days.

(21) Appl. No.: 15/736,273

(22) PCT Filed: Jun. 22, 2016

(86) PCT No.: PCT/EP2016/064475
§ 371 (c)(1),
(2) Date: Dec. 13, 2017

(87) PCT Pub. No.: WO2016/207249
PCT Pub. Date: Dec. 29, 2016

(65) Prior Publication Data
US 2018/0173825 A1 Jun. 21, 2018

(30) Foreign Application Priority Data
Jun. 25, 2015 (EP) .................................... 15305989

(51) Int. Cl.
*G06F 30/20* (2020.01)
*G06F 9/52* (2006.01)
(Continued)

(52) U.S. Cl.
CPC ................ *G06F 30/20* (2020.01); *G06F 9/46* (2013.01); *G06F 9/5066* (2013.01); *G06F 9/52* (2013.01); *G06F 30/33* (2020.01)

(58) Field of Classification Search
CPC ........... G06F 30/20; G06F 30/33; G06F 9/52; G06F 9/46; G06F 9/5066
See application file for complete search history.

(56) References Cited

U.S. PATENT DOCUMENTS 6,466,898 B1 * 10/2002 Chan ....................... G06F 30/33
703/17
9,817,771 B2 * 11/2017 Janssen ............... G06F 12/1466
(Continued)

OTHER PUBLICATIONS

W. Chen et al., "ESL design and multi-core validation using the System-on-Chip Environment," 2010 IEEE International High Level Design Validation and Test Workshop, Jun. 10, 2010, pp. 142-147, XP031698536.
(Continued)

*Primary Examiner* — Eunhee Kim
(74) *Attorney, Agent, or Firm* — Baker & Hostetler LLP

(57) ABSTRACT

A method of performing Electronic System Level simulation using a multi-core computing system comprises the steps of: A) Running a Discrete Event Simulation kernel on a core of the multi-core computing system, within a dedicated OS-kernel-level thread; B) Using the Discrete Event Simulation kernel for generating a plurality of OS-kernel-level threads, each associated to a respective core, and for distributing concurrent processes of the simulation among them; C) Carrying out parallel evaluation of the concurrent processes within the corresponding threads using respective cores; and then D) Using the Discrete Event Simulation kernel for processing event notifications, updating a simulation time and scheduling next processes to be evaluated; steps C) and D) being carried out iteratively until the end of the simula-
(Continued)

tion. A computer program product including a hardware description Application Program Interface and a Discrete Event Simulation kernel adapted for carrying out such a method is also provided.

10 Claims, 10 Drawing Sheets

(51) Int. Cl.
*G06F 9/46* (2006.01)
*G06F 9/50* (2006.01)
*G06F 30/33* (2020.01)

(56) References Cited

U.S. PATENT DOCUMENTS

| 9,898,348 | B2* | 2/2018 | Alexander | G06F 9/5077 |
| 2009/0222250 | A1* | 9/2009 | Ito | G06F 30/33 |
| | | | | 703/14 |
| 2015/0058859 | A1* | 2/2015 | Janssen | G06F 9/52 |
| | | | | 718/104 |

OTHER PUBLICATIONS

O. Bringmann et al., "The next generation of virtual prototyping: Ultra-fast yet accurate simulation of HW/SW systems," 2015 Design, Automation & Test in Europe Conference & Exhibition, Mar. 9, 2015, pp. 1698-1707, XP032765878.

R. Khaligh et al., "Efficient Parallel Transaction Level Simulation by Exploiting Temporal Decoupling," IFIP Advance in Information and Communication Technology, Jan. 1, 2009, vol. 310, pp. 149-158, XP055234827.

P. Ezudheen et al., "Parallelizing SystemC kernel for fast hardware simulation on SMP machines," 2009 ACM/IEEE/ SCS 23rd Workshop on Principles of Advanced and Distributed Simulation, Jun. 2009, pp. 80-87.

C. Schumacher et al, "parSC: Synchronous Parallel SystemC Simulation on Multi-Core Host Architectures," CODES+ISSS, Oct. 24-29, 2010, pp. 241-246.

B. Haetzer et al., "A comparison of parallel SystemC simulation approaches at RTL," Proceedings of the 2013 Forum on Specification and Design Languages, European Electronic Chips & System Design Initiative, vol. 978-2-9530504-9-3, Oct. 2014, pp. 1-8.

M. Chung et al., "SimParallel: A High Performance Parallel SystemC Simulator Using Hierarchical Multi-threading," International Symposium on Circuits and Systems (ISCAS), Jun. 2014, pp. 1472-1475.

* cited by examiner

COMPUTER-IMPLEMENTED METHOD OF PERFORMING PARALLELIZED ELECTRONIC-SYSTEM LEVEL SIMULATIONS

CROSS-REFERENCE TO RELATED APPLICATIONS

This application is a National Stage of International patent application PCT/EP2016/064475, filed on Jun. 22, 2016, which claims priority to foreign European patent application No. EP 15305989.4, filed on Jun. 25, 2015, the disclosures of which are incorporated by reference in their entirety.

FIELD OF THE INVENTION

The invention relates to the field of tools and methodologies for digital design, e.g. for designing systems-on-chip (SoC). More specifically, the invention relates to a computer-implemented method of performing Electronic System Level simulation using a multi-core computing system and parallel programming techniques, and to a computer program product for carrying out such a method.

BACKGROUND

A complex digital electronic system such as a SoC comprises application code designed to run on a specific hardware platform. Because of the high costs associated to design and manufacturing, the entire system must be validated as early as possible in the development flow, and in any case well before the hardware platform is manufactured. This is made possible by high-level—"Electronic System Level" or "ESL"—modeling and simulation tools, which allow modeling and co-developing the hardware and software parts of a complex system, software prototyping and even architectural exploration. These tools may also allow simulating user interfaces to accompany application development to the final product.

A large majority of these Electronic System Level simulation tools are based on a hardware description language called SystemC and on its extension named Transactional Level Modeling (TLM), which are part of the IEEE 1666 standard —2011. They have been developed by major EDA (Electronic Design Automation) vendors through the Accellera Systems Initiative and are widely used in the integrated circuit (IC) industry. SystemC comprises a specific C/C++ library and a Discrete Event Simulation (DES) kernel.

The SystemC kernel is composed of five main phases which are carried out sequentially and iteratively: (1) SystemC process evaluation; (2) immediate notification, (3) update; (4) delta notification and (5) timed notification. The first three phases form a so-called "delta-cycle".

A SystemC process is a function or software task describing the behavior of a part of a module of the system.

During the evaluation phase, all the processes present in a queue are evaluated, and each of them can write on signals or output ports (delta notification), notify an event to wake up other dependent processes (immediate notification) and/ or generate a timed event (timed notification).

Immediate notifications have the effect of immediately putting in the evaluation queue the sensitive dependent processes.

In the following update phase, all the signals and output ports which have been written upon by processes during the evaluation phase are updated. Indeed, as in any hardware description language, it is important that the statuses of signals and ports are only updated at the end of the evaluation phase, in order to emulate true concurrency.

Then, at the end of the update phase, the delta notification phase begins. It mainly consists in putting in the evaluation queue all the processes sensitive to events linked to delta notifications. For instance, if a signal is written, all the processes sensitive to this signal are put in the queue to be evaluated in the following iteration of the evaluation phase.

If the queue is not empty following the delta notification phase, the delta cycle is restarted.

Finally, the timed notification phase takes place. It involves triggering the evaluation of processes sensitive to timed events and updating the simulation step. In general, a SystemC simulation stops when the simulation step has reached a preset value, corresponding to the wanted simulation time.

Until a few years ago, the design of a complex digital system comprised the implementation of a software prototype of the hardware platform, capable of running the application code and supporting architectural exploration. So, a single model served as a platform for designing both hardware and software. These simulators allowed a unified design flow from application to hardware.

More recently, however, the increasing complexity of modern ICs, which may comprise billion of transistors, has made such hardware prototypes (more exactly: software models of hardware platforms) too slow for application development. This is particularly true for multiprocessor systems (MPSoC), wherein the number of simulated instructions per core is directly divided by the number of cores of the modeled system. For instance, a SystemC simulator with a speed of 2 MIPS (Millions simulated instructions per second) comprising a single-core SoC running at 1 GHz requires 8 minutes of "real", or physical, time to simulate 1 second of operation of the modeled system, but if the same simulator is used to model a 100-core MPSoC also running at a 1 GHz, the simulation duration reaches 13 hours, which is clearly unacceptable for architecture exploration or software development.

This has led to a situation where two distinct software platforms are used: an accurate (but slow) one for hardware development and a faster (but less accurate) one for software development. Unfortunately, this approach has its limitations. Indeed, as the systems become increasingly complex, it is not always possible to improve the simulation speed by reducing its accuracy. Furthermore, the loss of information and accuracy of models used for software development necessarily introduces errors in the design flow. Some tools try to ensure the compatibility of the different prototypes, but they are limited to specific platforms, with pre-designed models. It will then become more and more difficult for designers to develop proprietary platforms in acceptable times.

A different approach, which is the one followed by the present invention, consists in accelerating Electronic System Level simulations without reduction in accuracy by allowing the efficient parallel execution of an ESL simulation on multiple computing host cores, so that software and hardware prototypes can remain unified. As far as SystemC is concerned—but indeed this remark is more general—parallelization is only possible during the process evaluation phase. The difficulty then lies in the implementation of such parallelization to ensure a high level of performance. The parallelization of the process evaluation phase of SystemC simulation has already been proposed in the following publications:

P. Ezudheen et al. "Parallelizing SystemC kernel for fast hardware simulation on SMP machines", in Workshop on Principles of Advanced and Distributed Simulation (PADS), pages 80-87, Lake Placid, N.Y., USA, June 2009 (hereafter: Ezudheen);

C. Schumacher, R. Leupers, D. Petras and A. Hoffmann "parSC: Synchronous Parallel SystemC Simulation on Multi-Core Host Architectures", in CODES+ISSS, pages 241-246, Scottsdale, Ariz., USA, October 2010 (hereafter: Schumacher); and M.-K. Chung, J.-K. Kim, and S. Ryu "SimParallel: A High Performance Parallel SystemC Simulator Using Hierarchical Multi-threading", in International Symposium on Circuits and Systems (ISCAS), Melbourne, Australia, June 2014 (hereafter: Chung).

However, the simulation speed of these approaches is limited since the SystemC standard was never designed for a parallel implementation. They cannot efficiently handle multiple host cores, exhibit limited scalability and do not support TLM 2.0 and dynamic process creation. Moreover, Chung is not compliant with the standard as it does not support immediate events.

Document US2015/058859 describes a method for running parallel SystemC simulations on a multi-core computer. The method involves running a simulation kernel managing a plurality of threads. The teaching of this document does not allow an efficient allocation of the threads to the available cores of the computer.

The same applies to the paper by Bastian Haetzer et al. "A comparison of parallel SystemC simulation approaches at RTL", Proceedings of the 2013 Forum on Specification and Design Languages (FDL), European Electronic Chips & System Design Initiative—ECSI, Vol. 978-2-9530504-9-3, 14 Oct. 2014, pp. 1-8.

Document U.S. Pat. No. 6,466,898 describes a method of performing parallel logical-level simulations. The document teaches to share the simulation workload among all the available computing cores, including the one running a simulation kernel.

The paper by Chen Weiwei et al. "ESL design and multi-core validation using the System-on-Chip Environment", 2012 IEEE International High Level Design, Validation and Test Workshop (HLDVT), Piscataway, N.J., USA, 10 Jun. 2010, pp. 142-147 describes a method of performing parallel Electronic System Level simulation. Like U.S. Pat. No. 6,466,898, it teaches to share the simulation workload among all the available computing cores.

The paper by Oliver Bringmann et al. "The next generation of virtual prototyping: Ultra-fast yet accurate simulation of HW/SW systems" 2015 Design, Automation & Test in Europe Conference & Exhibition (DATE), EDAA, 9 Mar. 2015, pp. 1698-1707 discloses the use of temporal decoupling in ESL simulations. The same applies to the paper by Rauf Salimi Khaligh et al. "Efficient Parallel Transaction Level Simulation by Exploiting Temporal Decoupling" in: "IFIP Advances in Information and Communication Technology, 1 Jan. 2009.

The invention aims at overcoming the drawbacks of the prior art by providing an efficient and scalable parallelization of Electronic System Level simulations on multi-core computing systems.

SUMMARY OF THE INVENTION

An object of the present invention is a computer-implemented method of performing Electronic System Level simulation using a multi-core computing system, said Electronic System Level simulation comprising a plurality of concurrent processes, the method comprising the steps of:

A) Running a Discrete Event Simulation kernel on a core of said multi-core computing system, within a dedicated OS-kernel-level thread;

B) Using said Discrete Event Simulation kernel for generating a plurality of OS-kernel-level threads, each associated to a respective core of the multi-core computing system, other than the core on which said Discrete Event Simulation kernel is running, and for distributing the plurality of concurrent processes of said Electronic System Level simulation among said OS-kernel-level threads others than the one within which the Discrete Event Simulation kernel is running;

C) Carrying out parallel evaluation of said concurrent processes within the corresponding OS-kernel-level threads, using respective cores of the multi-core computing system others than the one within which the Discrete Event Simulation kernel is running; and then D) Using said Discrete Event Simulation kernel for updating signal and ports ensuring communication between processes, processing event notifications, updating a simulation time and scheduling next processes to be evaluated;

said steps C) and D) being carried out iteratively until the end of the simulation.

Another object of the invention is a computer program product including a hardware description Application Program Interface and a Discrete Event Simulation kernel adapted for carrying out such a method.

Particular embodiments of the invention constitute the subject-matter of the dependent claims.

BRIEF DESCRIPTION OF THE DRAWINGS

Additional features and advantages of the present invention will become apparent from the subsequent description, taken in conjunction with the accompanying drawings, wherein.

DETAILED DESCRIPTION

Figure 1:
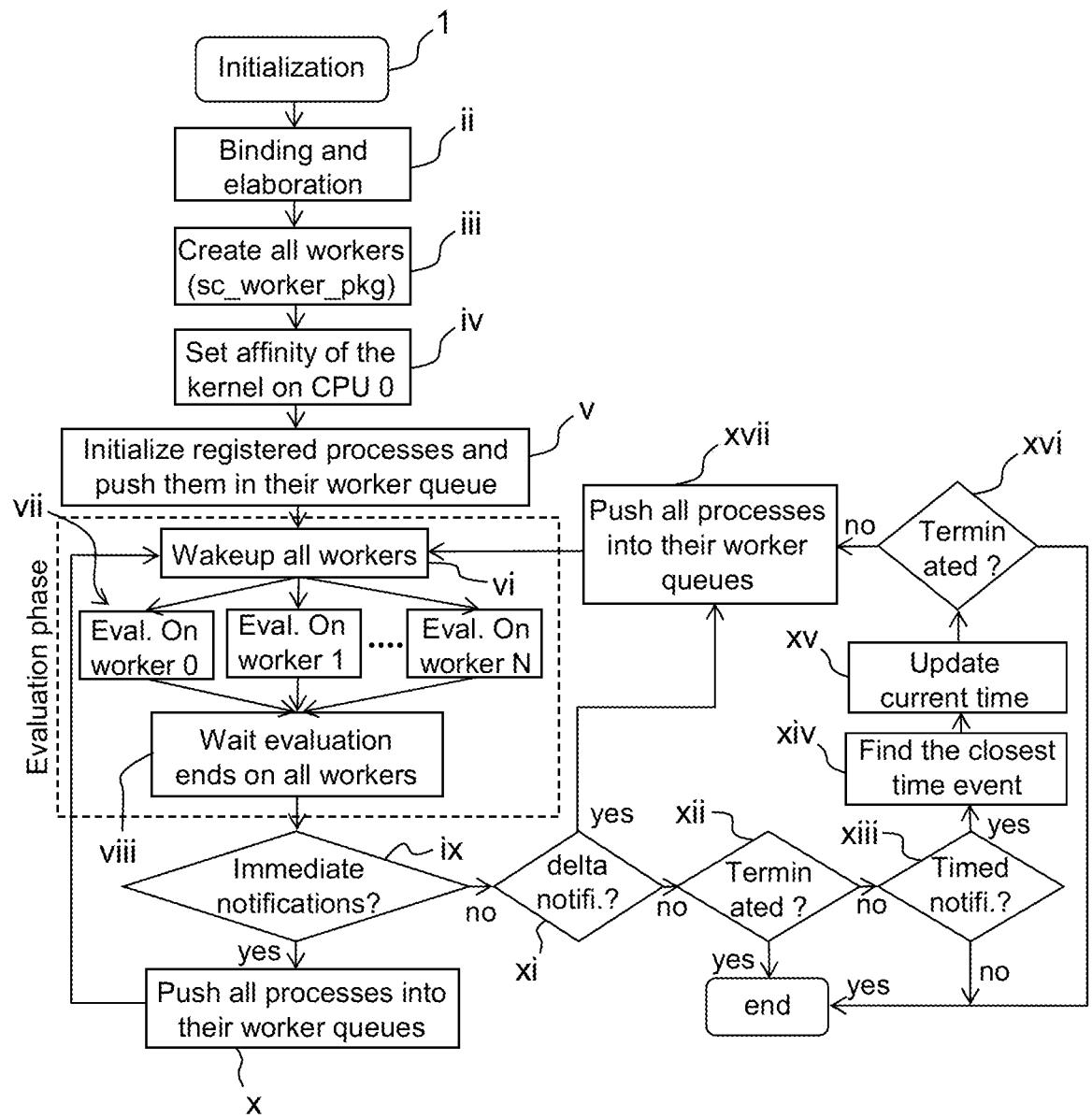
FIG. 1 is a flow-chart of a parallelized ESL simulation according to an embodiment of the invention.

In the following description, the terms "simulation" and "modeling" will be considered synonyms, albeit strictly speaking a simulation results from the execution of a model.

Moreover, in the following description the term "kernel" will be used with two different meanings. On the one hand, it can refer to the Operating System (OS) kernel, on the other hand in can refer to the simulation kernel, i.e. the program responsible for scheduling the evaluation of simulation processes and handling the notification cases.

Albeit only the case of SystemC is considered in the description below, this is not limiting and other existing or future ESL languages may benefit from the invention. Only an implementation working under the Linux Operating System will be considered, but again this is not limiting.

According to the invention, the process evaluation phase is processed by executing SystemC processes inside respective OS-kernel-level thread. These Posix threads, named workers, are used as containers to locally execute SystemC processes, and more precisely SC_METHOD and SC_THREAD processes. It is recalled that both SC_METHOD and SC_THREAD are SystemC processes inheriting from a common class. The main difference between them is that only SC-THREAD processes have an execution context allowing them to be preempted.

SC_METHOD processes are functions called by the worker and SC_THREAD processes are user-level threads using ucontext primitives executed inside a worker's context. The whole simulation remains into a single Linux process.

According to a preferred embodiment of the invention, processes are associated to a given worker and cannot switch to another one; this is named worker affinity (alternative embodiments are possible, such as "work stealing", wherein workers compete for executing processes). Only the worker affinity of dynamic processes (sc_spawn) can be set at run-time but cannot change afterwards. Each worker can access two waiting queues to perform evaluations: one for SC_METHOD and one for SC_THREAD processes. Moreover, each worker is statically attached to a unique logical host core ("core affinity"), while a different core is uniquely dedicated to run the simulation kernel.

In a specific implementation, a new C++ class named sc_worker_pkg has been developed to support the management of workers. A set of 25 member functions enables queue access and management, the evaluation of SystemC processes or the allocation on host cores. An operator<<working with SC_METHOD and SC_THREAD can be used at process instantiation to inform the kernel about their worker affinity. By defaults, all processes are attached to worker 0. In the example below, the process do_count will be executed on the worker ID_WORKER.

SC_THREAD (do_count)
Dont_initialize ( );
sc_sensitive<<clock.pos ( );
sc_affinity<<ID_WORKER;

As mentioned above, a specific kernel-level thread is reserved for the execution of the SystemC kernel on the logical host core 0 ("CPU 0"). This logical host core is reserved for this purpose, and does not execute workers. This thread is in charge of the initialization, the elaboration and the execution of the update, the immediate and the timed notification phases, as labeled in the SystemC standard. At the beginning of each evaluation phase, it distributes the ready-to-be-evaluated SC_METHOD and SC_THREAD processes into different worker queues. This thread is also in charge of updating the global time, forcing all workers to synchronize their current time every quantum.

FIG. 1 is a flow-chart of a simulation method according to the invention, implementing the principles outlined above.

At the initialization of the kernel (i), and after the binding and the elaboration phase—i.e. the instantiation and dynamical creation of the model to be simulated (ii), all workers are created and attached to different host logical cores (iii).

Then, the allocation of the main SystemC kernel is forced on the logical core 0—also called CPU 0—(iv) and all registered processes are pushed in their respective worker queue (v). After their initializations, the ready Posix semaphores are set to allow the workers to start in parallel the evaluation of their process queues (vi). Each worker starts by sequentially evaluating (i.e. executing, or running, these terms being synonyms) all its SC_METHOD processes and then cooperatively executes all its SC_THREAD ones (vii). During the parallel evaluation of all SystemC processes by workers, the kernel performs low-latency polling, preferably, on different memory locations (one for each worker) through the call of atomic functions (viii). This active barrier guarantees that the host OS will never yield the kernel thread, which could generate low kernel reactivity and therefore a significant overhead. The other steps of the simulation are conventional:

if immediate notifications are present (ix), then the processes woken up by these notifications are put into the corresponding worker queues (x); otherwise:

if delta notifications are present (xi), then the processes woken-up by these notifications are put into the corresponding worker queues (xvii); otherwise:

unless the simulation is terminated (xii), it is checked if timed notifications are present (xiii) and, in the affirmative, the closest time event is found (xiv) and the current simulation time is updated (xv), otherwise the simulation is terminated. Then, if the simulation is not terminated (xvi), the processes which remain to be evaluated are pushed into their worker queues (xvii).

Concerning parallel data accesses inside the model, the SystemC processes themselves must ensure the global coherency and integrity of shared resources. As soon as a global variable or an attribute of a class is modified during a transaction, this resource has to be protected. Indeed, different transactions can transit through the same resource in parallel on two different host cores. Then, protection based on Posix mutexes is conveniently added to guarantee the integrity of the simulator. Multiple locks can be taken when calling a transport function. For instance, the use of a hierarchical NoC (Network on a Chip) could require the availability of multiple mutexes before accessing the final target. A simple mechanism can be used to implement the wait statement in order to prevent the risk of deadlocks if a transaction is preempted: each process owns a local mutex list to store all taken mutexes during a communication; this list is automatically updated when new SystemC lock and unlock functions are called; when a process is preempted, all mutexes in the list are automatically released by the kernel; the same mutexes will be taken again before the kernel resumes it.

Figure 2:
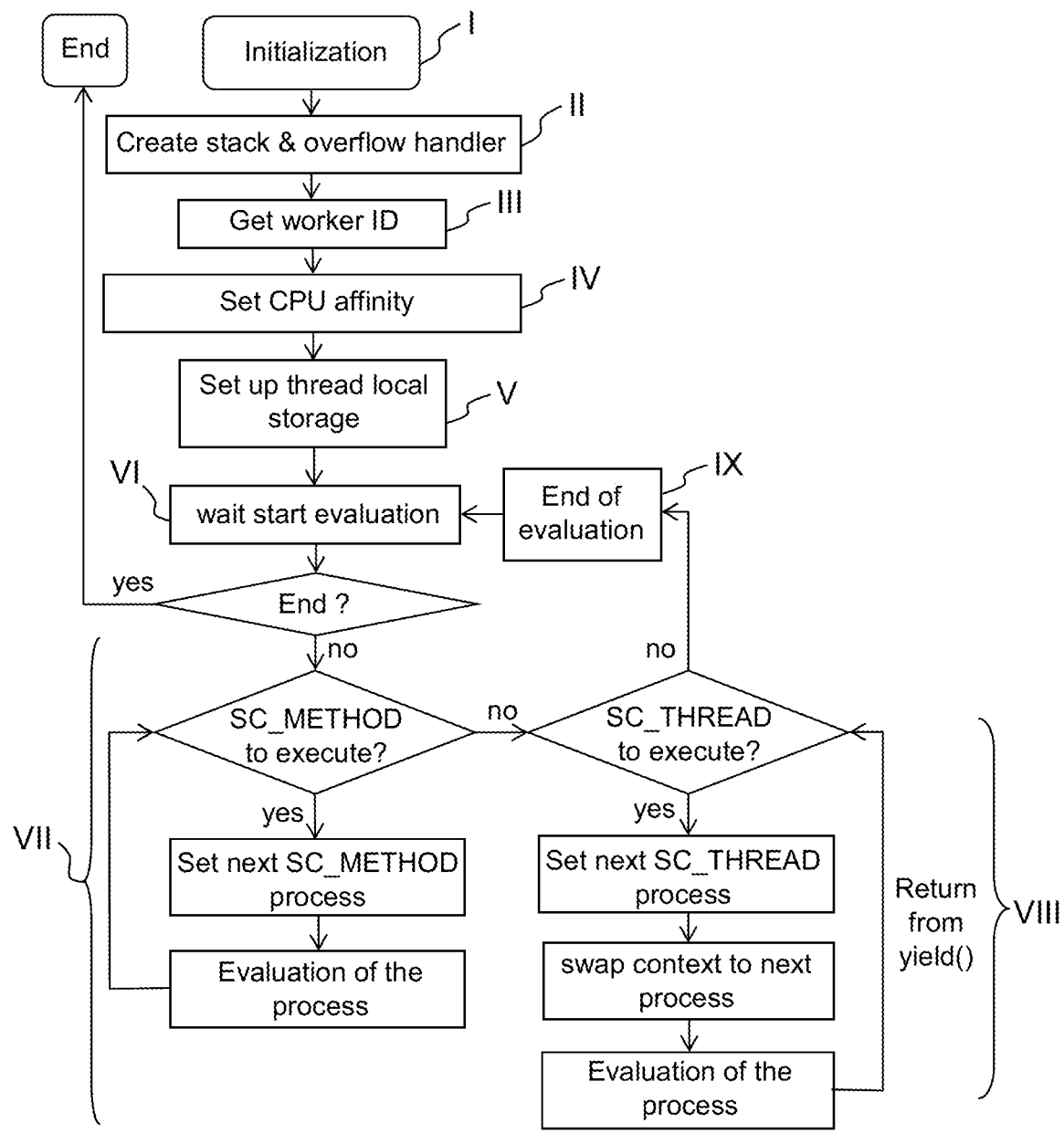
FIG. 2 is a flow-chart of the process evaluation phase executed on a host core of the multi-core computing system used to implement the invention.

FIG. 2 is a flow-chart of the process evaluation phase carried out by each worker running on a logical host core. First of all, a worker initializes itself (I), creates a stack and an overflow handler (II), gets an ID (III), sets its CPU affinity (IV), sets up local storage (V). Then it enters an "active" wait (VI), wherein it regularly reads a memory location (preferably a different location for each worker) to look for a value indicating that it can start execution of its execution queues; this is similar to the kernel mechanism described above, cf. reference viii of FIG. 1. Then the worker evaluates successively the SC_METHOD and the SC_THREAD processes. SC_METHOD processes terminate themselves (they have a beginning and an end according to the SystemC standard), so the worker only has to call them one after the other. SC_THREAD processes, on the contrary, have no end, and their execution is performed cooperatively. Each SC_THREADS process contains a call to the yield( ) function (called by the function 'wait( )') which forces its pre-emption and enable the evaluation of another SC_THREAD process. When the evaluation of all the processes has been carried out, a message is sent to the kernel of SystemC to inform the kernel that the worker has finished its evaluation phase (IX) and it will then be placed back into its active waiting state (VII).

The synchronization of the concurrent processes of the simulation (or "temporal decoupling") has a very relevant impact on the simulation time. The conventional solution, illustrated on panel (a) of FIG. 3, consists in synchronizing SC_THREAD processes when their local time offsets reach a given maximum equal to a global quantum. This can cause a drastic parallelism reduction. Indeed, the timed notification phase looks for the nearest timed event to wake-up all the sensitive processes. If the processes do not wait for the same timed event, they cannot be executed on workers in parallel. On FIG. 3a, for example, at first processes P0 and P1 are executed in parallel, but then P1 waits until time=110, while process P0 only waits until time=100. As a consequence, the second evaluations of P0 and P1 will be performed at different times, making parallelization useless. Similarly, the third evaluation of P1 will only begins at time=216 (106+110), well after the beginning of the third evaluation of P0, at time=208 (108+100).

Figure 3:
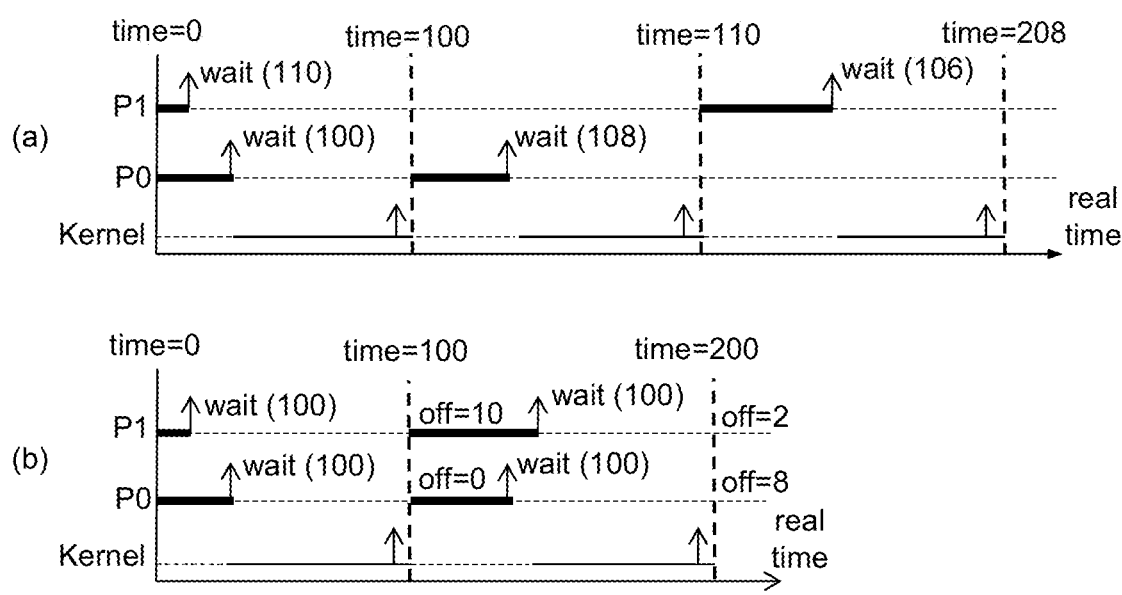
FIG. 3 illustrates the implementation of temporal decoupling according to an embodiment of the invention.

According to a preferred embodiment of the invention, temporal decoupling makes use of a system global quantum, which synchronizes all SC_THREAD processes on regular synchronization times—see FIG. 3, panel (b). According to this implementation, the wait statement is constant for each SC_THREAD process (100 time units, in the example of the figure), which guarantees a full parallel evaluation of processes. When the local simulation time is higher than the quantum value, the process waits for the quantum value and keeps the time difference as a time offset. The next time the process is scheduled, the local time starts at the offset value to maintain a high accuracy. For instance, in the example of FIG. 3, the offset of P1 takes the value 10 after the second evaluation of the process and 2 after its third evaluation, while that of P0 takes the value 0 after the second evaluation and 8 after the third one.

In pseudo-code:

```
Increment (local_time_offset)    //after each instruction, the local time offset
                                 //is incremented by a value corresponding to //the
                                 execution time of the instruction.
While(local_time_offset > quantum )
   {
   Wait (quantum);
   local_time_offset -= quantum
   }        // If the local simulation time exceeds the quantum, then
            // the process waits for the quantum time and the local
            //time offset is decremented by the same value.
```

This time decoupling is not implemented by the kernel, but is embedded in the system model.

In order to make parallelization efficient, it is also important to ensure that parallel processes have parallel access to the kernel resources. According to a preferred embodiment of the invention, most of shared-resources like immediate, delta, timed and update events queues are duplicated, using known vectorization techniques, to support parallel write accesses.

An advantageous feature of the invention is that parallelization is almost transparent to the user. If the simulator is known by the designer, only few minutes of work are necessary to adapt an existing Accellera SystemC simulation environment. First of all, according to a specific embodiment of the invention, in the main function, the number of maximum workers must be set with the primitive sc_set_n-b_worker_max(uint32_t val) and Posix mutexes must be created to protect specific resources if necessary. One simple way is to integrate theses mutexes in the transport interfaces of SystemC modules that must be protected. Finally, each SystemC process must be associated to a worker with the primitive worker_affinity; with dynamic sc_spawn processes, the option member set_worker_affinity(unit32_t worker id) has to be called.

Figure 4:
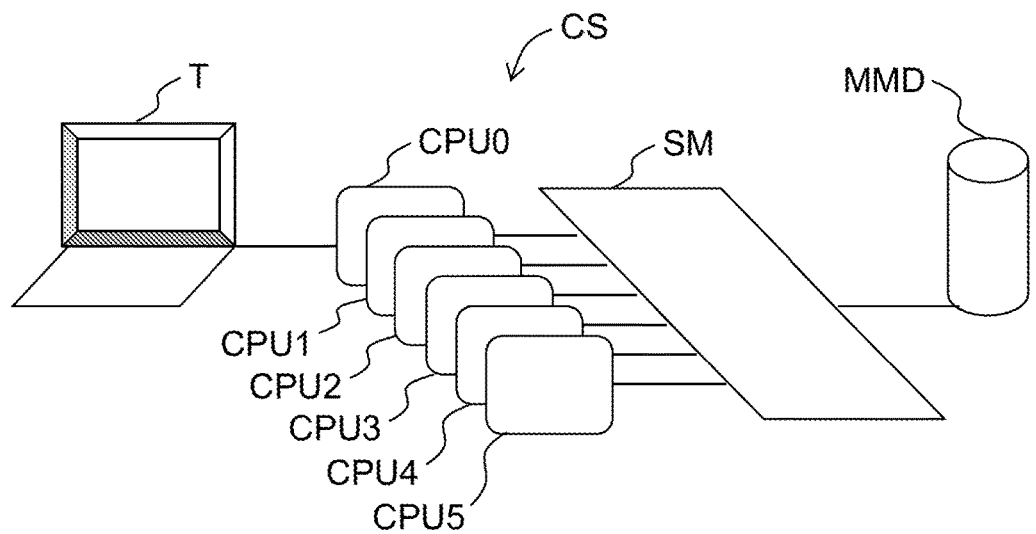
FIG. 4 is a schematic representation of a multi-core computing system suitable to carry out a method according to an embodiment of the invention.

A simulation method according to the invention can be carried out using a computer program product including instruction code for implementing a Discrete Event Simulation kernel supporting parallel evaluation of SystemC processes, as discussed above with reference to FIG. 1, and a suitable hardware description Application Program Interface (API). Such a computer program product, together with an executable ESL model based on it, may be stored in a mass-memory device MMD (e.g. a hard disk) of a multi-core computing system whose simplified architecture is illustrated on FIG. 4. This multi-core computing system CS comprises a plurality of host cores CPU0-CPU5 having access to a shared memory SM; a terminal T is connected to one of these cores. As discussed above, the simulation kernel runs on CPU0, while workers run on CPU1-CPU5. The host cores may be co-localized, in which case the multi-core computing system is a parallel computer, or they may be spatially distributed and interconnected through a telecommunication network. The shared memory can be co-localized with one or more of the cores, or not; it may even be distributed. The same applies to the mass-memory device(s). The computer program product and the executable model may even be distributed among several, possibly non co-localized, mass-memory devices.

The technical results of the invention will now be assessed by considering its capability to accelerate TLM simulations of multi and manycore architectures.

Figure 5:
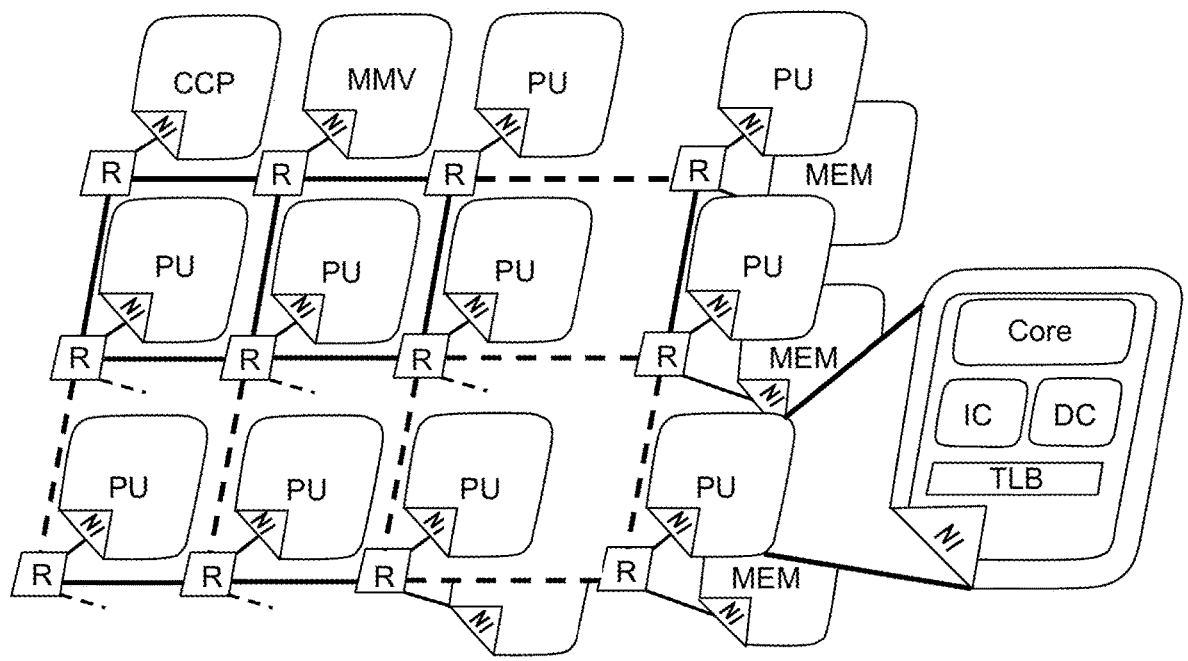
FIG. 5 is a representation of an MPSoC architecture using a physically-distributed shared memory, which can be modeled according to the invention.

The simulated architecture, schematically illustrated on FIG. 5, is a 2D-mesh manycore architecture using a physically-distributed shared memory. This architecture comprises a bi-dimensional array of tiles interconnected by an interconnection network. Each tile comprises a processing unit PU and a portion MEM of the shared memory, both connected to the network through a respective network interconnect NI and a router R. Each processing unit PU, in turn, comprises a Core, an instruction cache (IC), a data cache (DC) and a translation lookaside buffer (TLB). A Central Control Manager CCP and a Memory Management Unit MMU, also connected to the interconnection network through respective routers, are used for task management and memory allocation, respectively. It is important to differentiate the simulated manycore architecture of FIG. 5 from the multi-core computing system which is used to run the simulation.

Two simulation environments, named SESAM and SimSoC, will be considered.

SESAM uses functional Instruction Set Simulators (ISS) based on the ArchC Hardware Description Language and provides a set of timed/untimed/functional or cycle-accurate IPs (NoC, memory controllers, etc.). SESAM uses a temporal-decoupling technique, based on a system global quantum, to model timings and limit synchronizations with the SystemC kernel. For the evaluations, a (un)timed 2D-mesh parallel NoC with multiple shared-resource locks in slave wrappers to protect memory banks will be considered. The equivalent cycle-accurate NoC will also be used for comparison with Accellera SystemC. With SESAM, MIPS 32 R2 processing cores are considered.

The second environment, named SimSoC, is a SystemC/TLM 2.0 simulation framework using ISSes with Dynamic Binary Translation (DBT). Only DMI was used, and therefore ISSes directly communicate with a single shared memory allocated on the host, instead of multiple memory banks. With SimSoC, PowerPC processing cores are chosen.

For the evaluation, the processing unit (PU) composed of the core, its instruction and data caches, and its TLB were integrated into one worker to minimize communications between shared-resources. All other SystemC processes were gathered in another single worker. Concerning SimSoC, only DBT with no specialization (mode M1) was considered because it ensures a more regular execution time between the workers and then better parallelization. In order to evaluate the performances of the invention, five 62-task parallel shared-memory applications of approximately 1 billion instructions each were considered:

NOP is based on multiple loops of NoP operations and has been chosen to highlight the maximum acceleration that can be reached.

DPI is the lightweight deep packet inspection (DPI) application distributed by Packetwerk GmbH, which consists in analyzing multi-protocol Ethernet packets.

Mult. is a parallel matrix multiplying application.

Der. is a parallel Deriche image application based on a fast 2D-Gaussian convolution IIR approximation.

Neu:NT is a road sign detection application based on Conventional Neural Network (CNN).

All results were obtained on an AMD Opteron 6276 at 2.3 GHz composed of 4 sockets of 8 HT cores (total of 64 logical cores) running a program according to the invention or Accellera SystemC QT 2.3.1 on a Debian 6.0 Accellera SystemC.

Figure 6A:
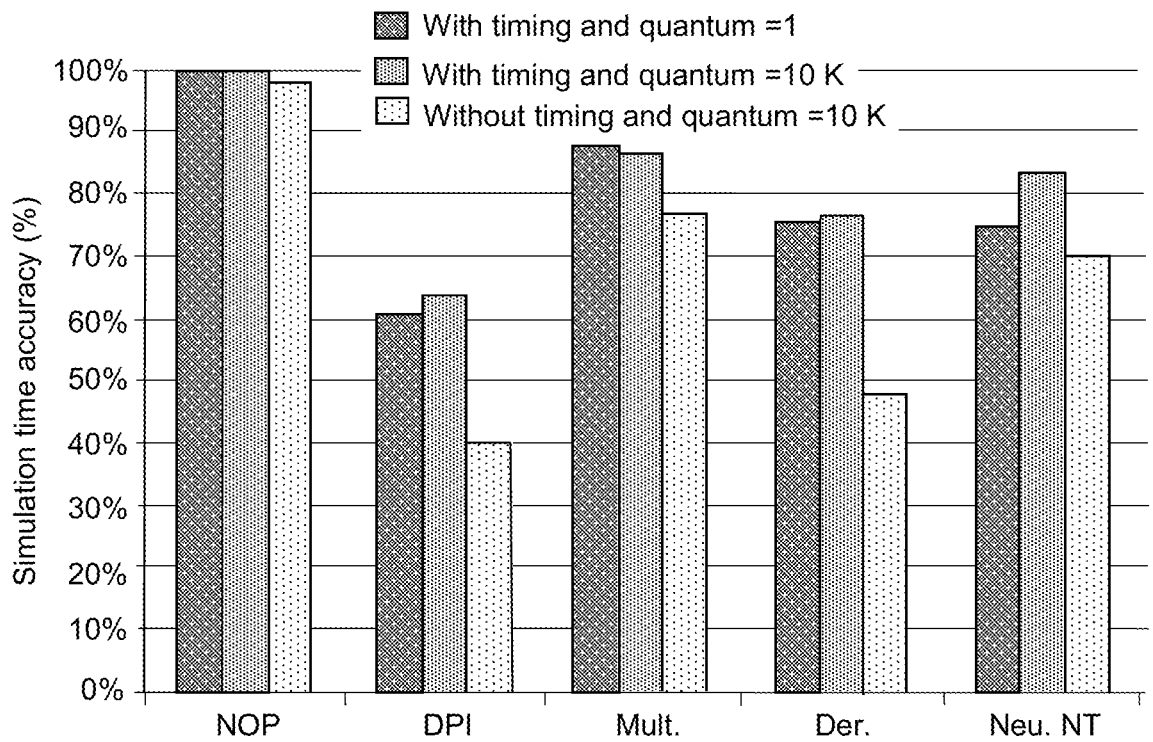
FIGS. 6A, 6B and 6C are graphs illustrating the performances of Accellera SystemC in modeling an MPSoC having the architecture represented on FIG. 5.
Figure 6B:
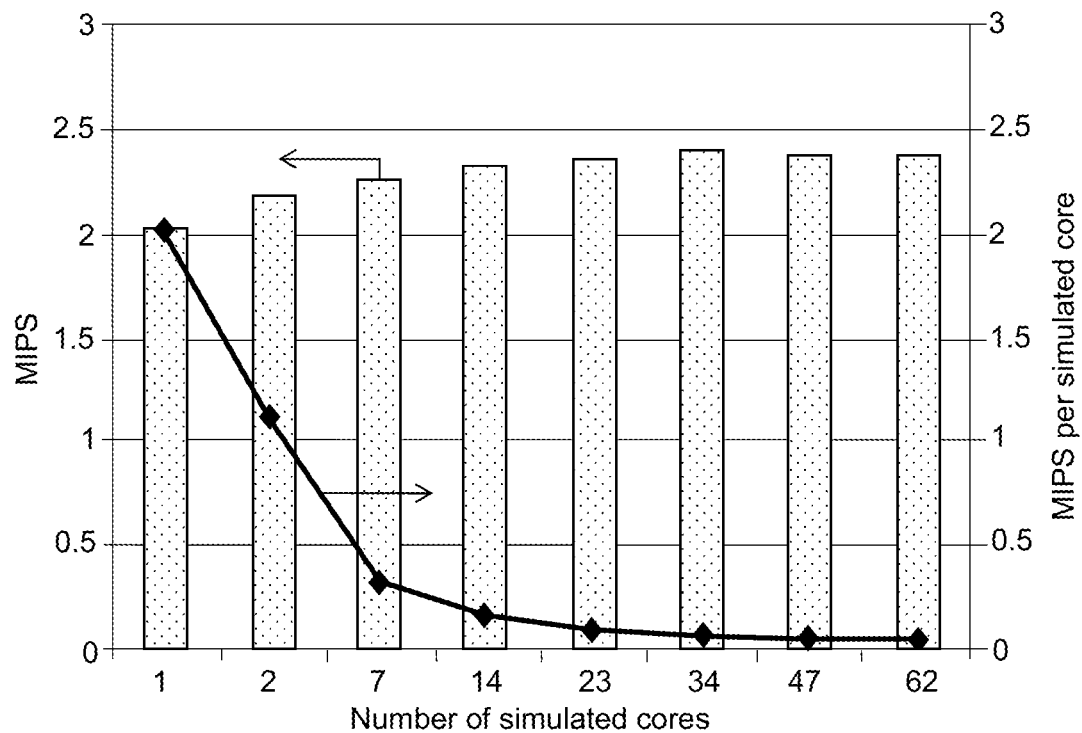
Figure 6C:
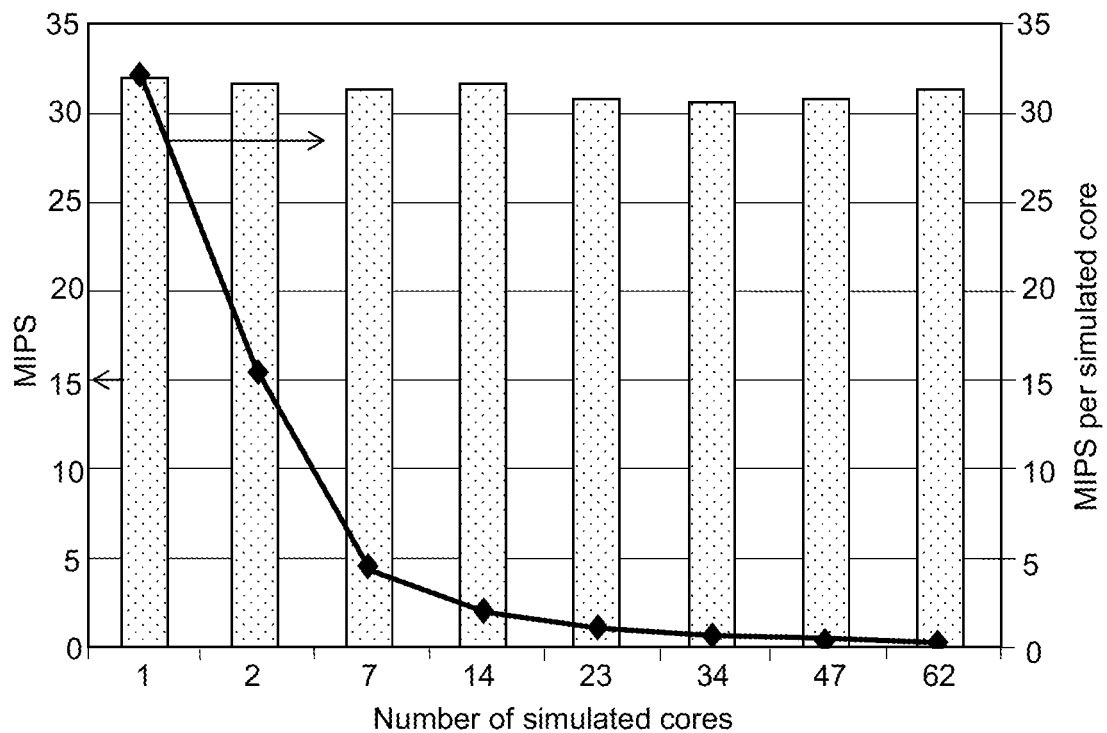

FIGS. 6A-6C represent the results obtained with Accellera SystemC.

FIG. 6A analyzes how the accuracy behaves when modifying the quantum or modeling the timing for a case with timing and quantum=1, with timing and quantum=10 k and with no timing and quantum=10 k. It shows that with such 2D-manycore architecture, simulation time accuracy can be strongly impacted when the application is sensitive to contentions. This is even more pronounced when timing is not modeled and the accuracy is reduced by 60% with the DPI benchmark. With a larger quantum, the accuracy seems to increase because a relaxed synchronization results in a longer execution time. Architecture modeling is always a trade-off between accuracy and speed.

As depicted in FIGS. 6B and 6C, referring to SESAM and SimSoC respectively, Accelera SystemC does not scale with the number of cores. The number of MIPS remains the same and simulation speed is approximately divided by the number of simulated cores. This result is the same with non-DBT or DBT ISS even if the latter significantly reduces simulation time by reaching about 32MIPS instead of 2.4MIPS.

Figure 7A:
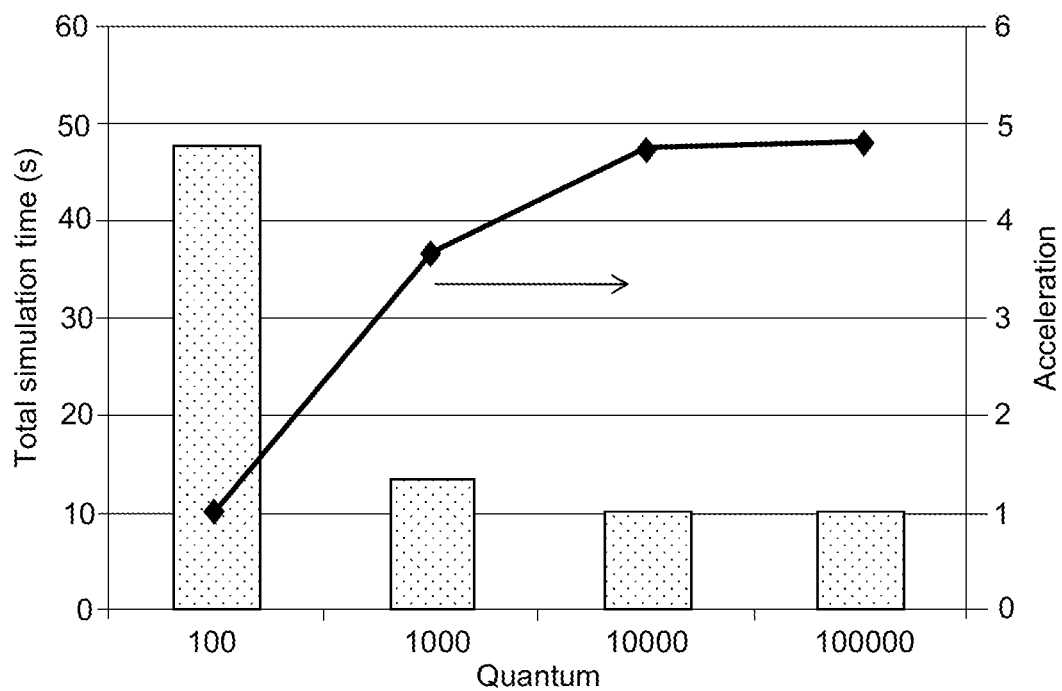
FIGS. 7A-7F and 8A-8C are graphs illustrating the performances of an embodiment of the invention in modeling an MPSoC having the architecture represented on FIG. 5.
Figure 7B:
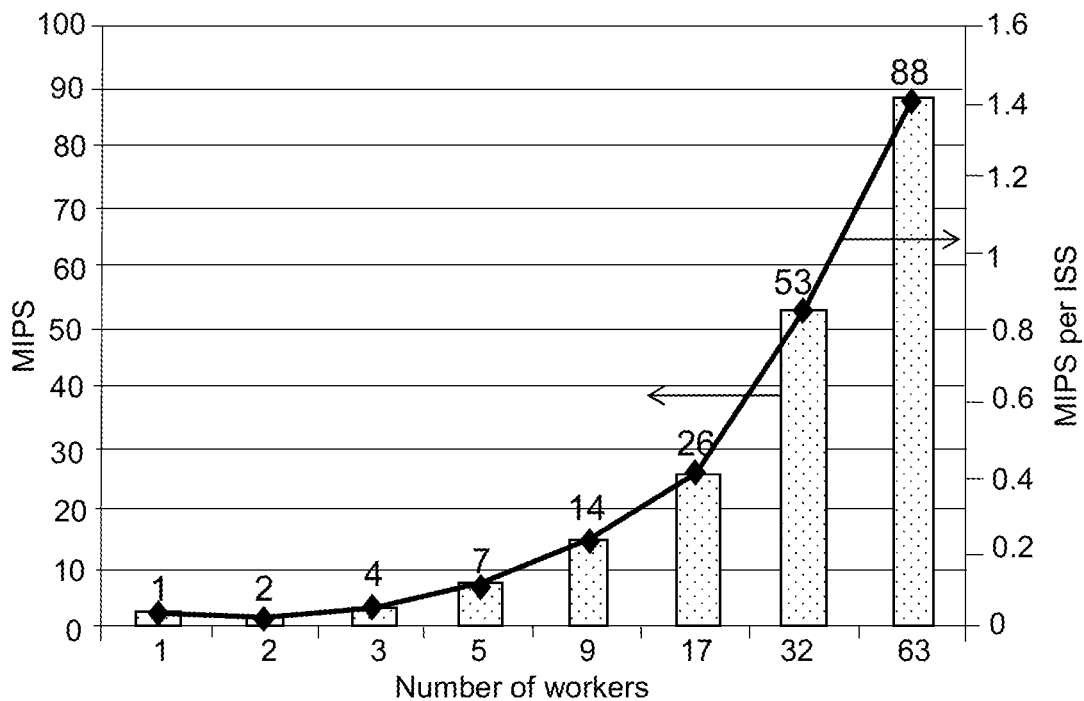
Figure 7C:
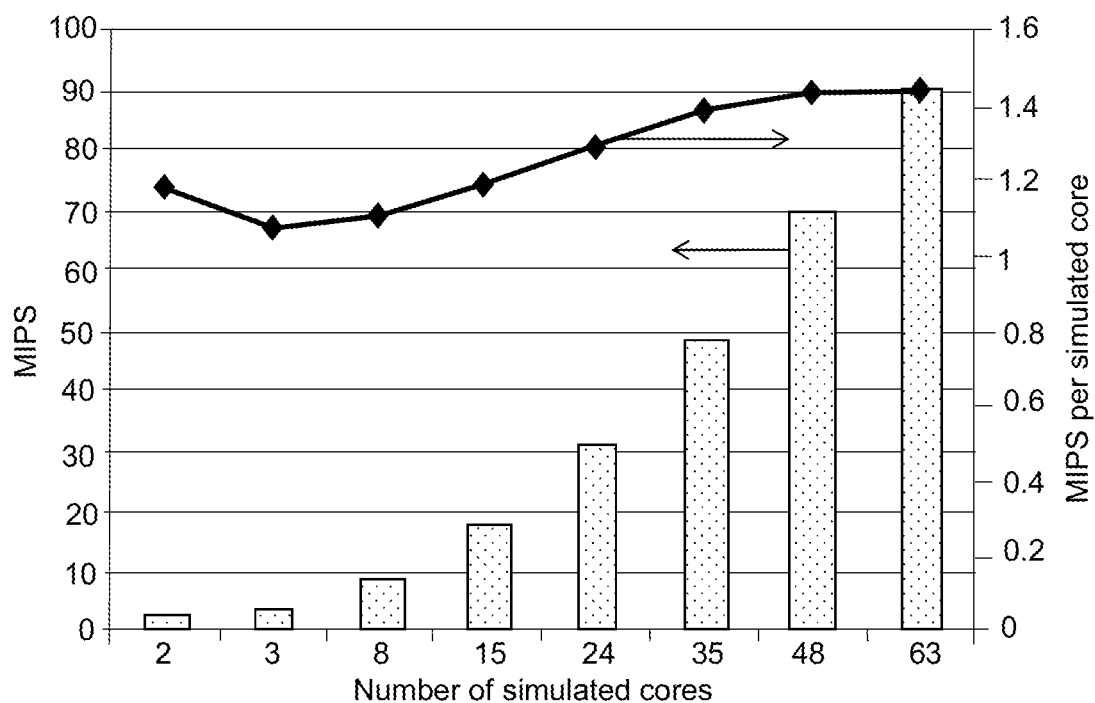
Figure 7D:
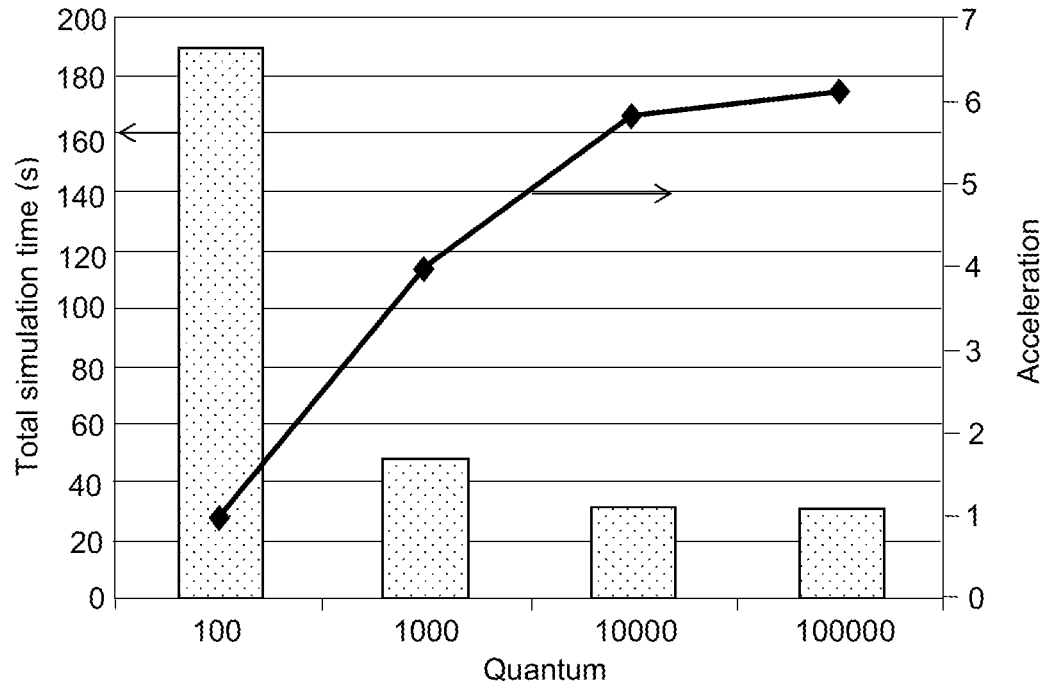

FIGS. 7A-7F show the theoretical results that could be obtained with SESAM and SimSoC using SCale. First of all, as shown in FIGS. 7A and 7D, the quantum has a direct impact on simulation speed (acceleration of 4.8× and 6.1×). Indeed, the quantum value changes the maximum number of simulation cycles, and simulated instructions, between two synchronizations with the kernel. In the following experiments, a quantum of 10K will be considered as a good trade-off between performance and accuracy.

Figure 7E:
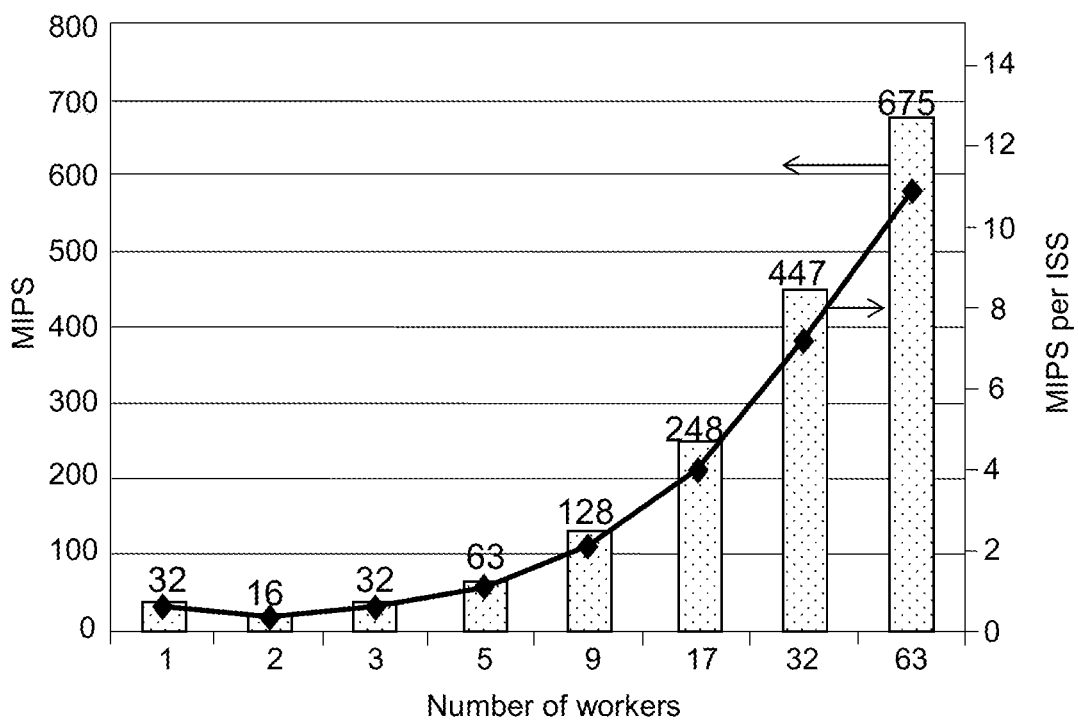

FIGS. 7B and 7E show the performance obtained when increasing the number of workers. The maximum numbers of MIPS obtained with SESAM and SimSoC are 88MIPS and 675MIPS. This represents an acceleration of 36× and 21× compared to the same simulation with Accellera SystemC. These results demonstrate the high-scaling potential of SCale to leverage the multiple cores of the host machine when simulating MPSoC architectures. These performance values may vary due to the non-predictability of the host machine using cache memories and the Linux OS.

Figure 7F:
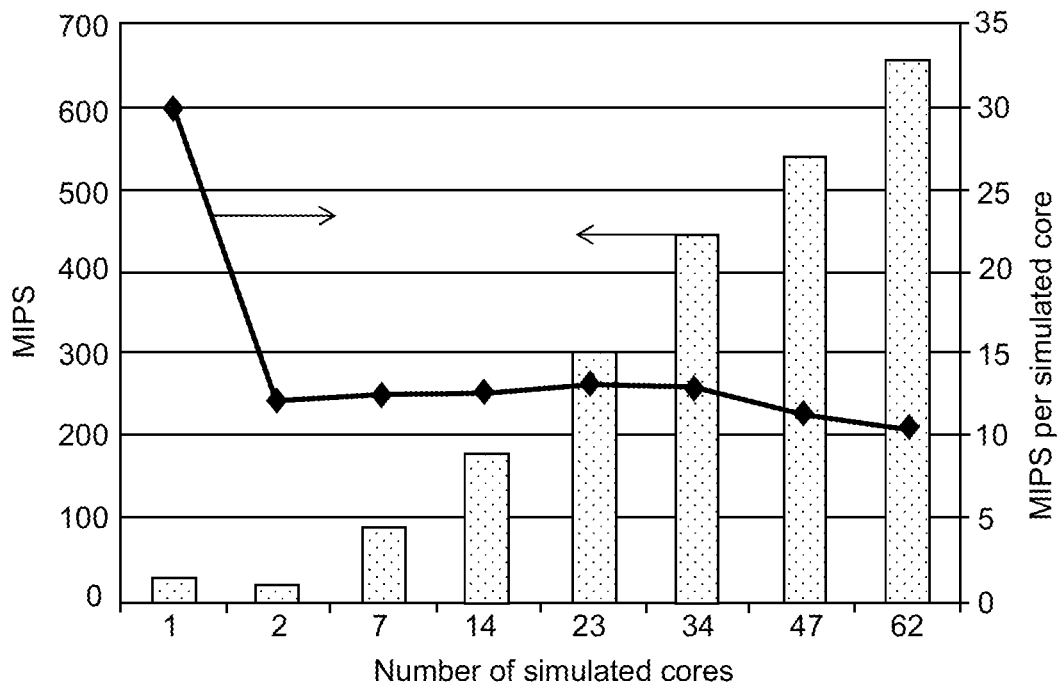

FIGS. 7C and 7F depict the maximum number of MIPS obtained with 63 workers with SESAM and SimSoC when increasing the number of simulated cores. As expected, the number of MIPS per simulated cores remain very high and constant, whatever the simulation environment is. The maximum numbers of MIPS per ISS is about 1.4 with SESAM and 13.2 with SimSoC. A little degradation appears when using more than one core for cache pollution reason.

Figure 8A:
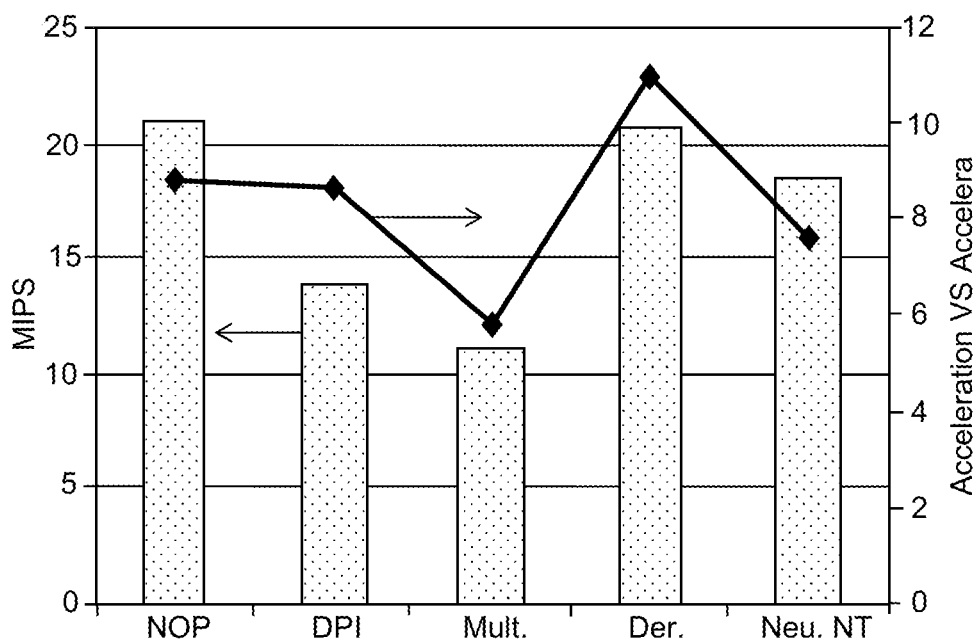
Figure 8B:
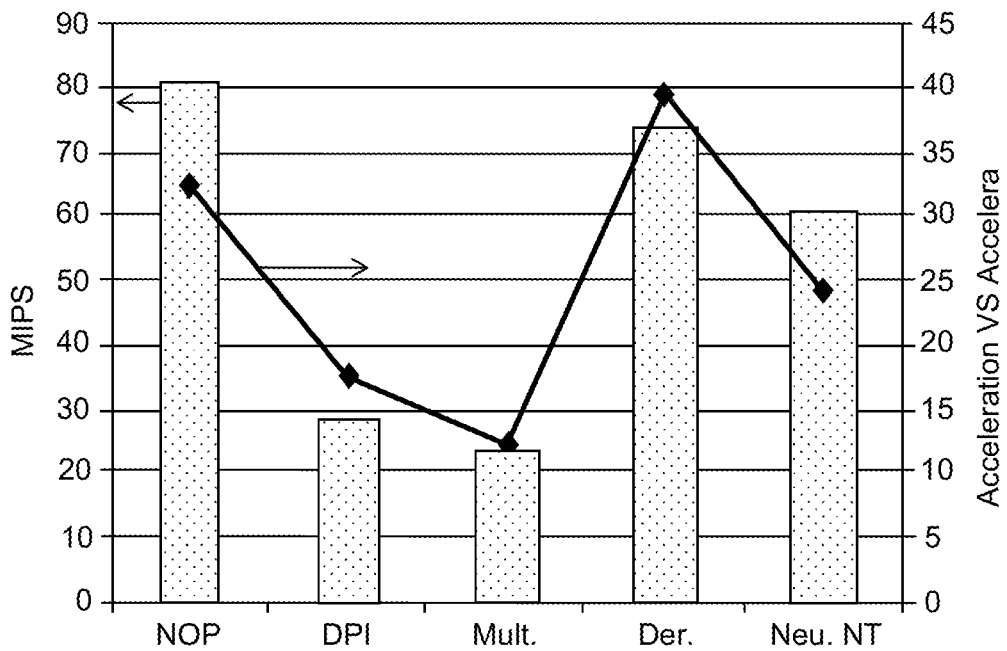
Figure 8C:
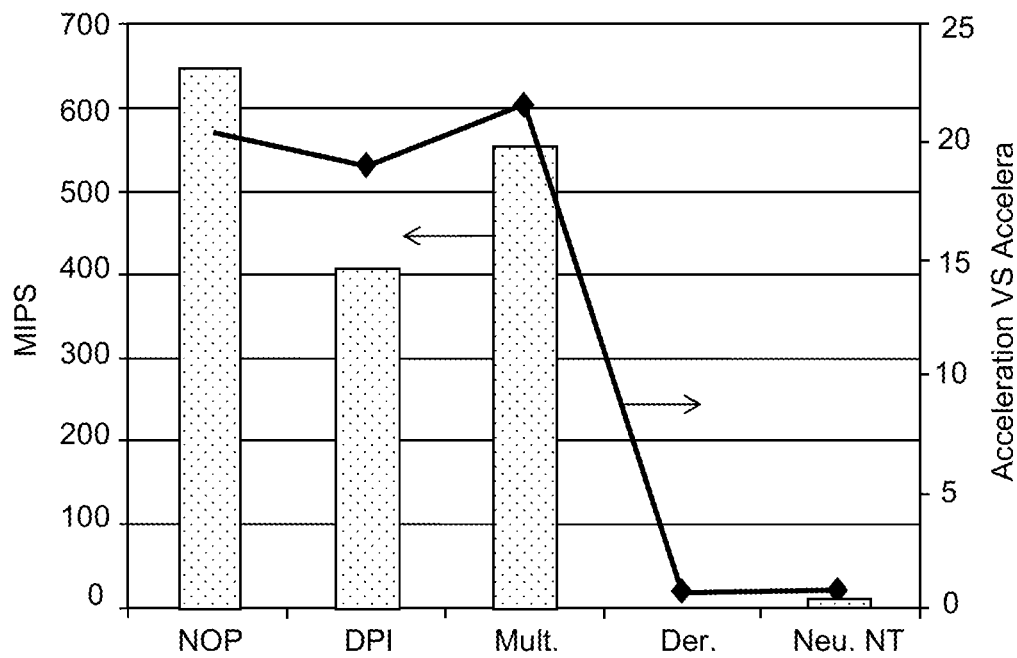

Finally, FIGS. 8A-8C depict the simulation performances of the invention compared to Accellera SystemC when executing different applications on our manycore model. As expected, when activating timings within SESAM, simulation speed slows down by approximately 4 times. The benchmarks with more memory contentions (DPI and Mult) are the most impacted. Indeed with timing, workers need to synchronize more often with the kernel since the quantum value is more quickly reached. Without timing, the maximum acceleration remains between 12.2× and 39.3× compared to Accellera SystemC while keeping an accuracy higher than 99.5%. The number of MIPS varies between 23.4 (Mutt) and 80.6 (NOP) on 63 workers. Even with shared-memory applications, high simulation speed can be reached with SESAM.

The results are slightly different with SimSoC. In this case, the peak MIPS is higher thanks to DBT but the acceleration reaches only 21.3× with Mult while keeping an accuracy close to 100%. However, the invention increases the simulation time with frequent memory access benchmarks (Der and Neu NT). This is due to the shared-resource protection inserted in the model. In SESAM this effect is hidden by the multiple memory banks. Contrary to SimSOC, a smart MMU is used in SESAM to distribute instructions and data in different memory banks to increase parallel accesses. The inventive method can only exploit the parallelism of architectures and applications; a non-parallel system will show no acceleration.

The invention claimed is:

1. A computer-implemented method of performing Electronic System Level simulation using a multi-core computing system (CS), said Electronic System Level simulation comprising a plurality of concurrent processes, the method comprising the steps of:
A) running a Discrete Event Simulation kernel on a core of said multi-core computing system, within a dedicated operating system (OS)-kernel-level thread;

B) using said Discrete Event Simulation kernel for generating a plurality of other OS-kernel-level threads, each associated with a different core of the multi-core computing system, and for distributing the plurality of concurrent processes of said Electronic System Level simulation among said other OS-kernel-level threads;

C) carrying out parallel evaluation of said concurrent processes within the other OS-kernel-level threads, using the different cores; and then D) using said Discrete Event Simulation kernel for updating signal and ports ensuring communication between processes, processing event notifications, updating a simulation time and scheduling next processes to be evaluated;

said steps C) and D) being carried out iteratively until an end of the simulation.

2. The method according to claim 1 wherein step C) comprises:

synchronizing at a single and shared predetermined synchronization time processes evaluated by different cores of said multi-core computing system; and within each of said concurrent processes of said Electronic System Level simulation, keeping track of an offset between a local simulation time and said preset synchronization time.

3. The method according to claim 2 wherein each of said concurrent processes of said Electronic System Level simulation includes a local time offset variable, and wherein said step C) comprises, for each of said processes:

evaluating an instruction of the corresponding process of said Electronic System Level simulation and incrementing said local time offset variable by a value corresponding to a simulated execution time;

if the incremented local time offset variable exceeds a preset value, identical for all of said threads, decrementing the incremented local time offset variable by said preset value, and waiting a time corresponding to said preset value before evaluating the following instruction.

4. The method according to claim 1 wherein inactive OS-kernel-level threads enter an active waiting state to avoid preemption from an operating system of said multi-core computing system.

5. The method according to claim 4 wherein:

after each iteration of said step C), and before a first iteration of said step C), each of said OS-kernel-level threads other than the dedicated OS-kernel-level thread enters said active waiting state and polls a respective memory location until the each OS-kernel-level thread reads a predetermined value;

after each iteration of said step D), except the last one, and after completion of said step B, the kernel writes said predetermined value in said predetermined memory locations; and when a first OS-kernel-level thread other than the dedicated OS-kernel-level thread reads said predetermined value from said predetermined memory locations, the first OS-kernel-level thread exits said active waiting state and performs an iteration of said step C).

6. The method according to claim 4 wherein:

after each iteration of said step D), the dedicated OS-kernel-level thread enters said active waiting state and polls a plurality of predetermined memory locations until the dedicated OS-kernel-level thread reads a predetermined value in each of the locations;

after completing each iteration of said step C), each of said OS-kernel-level threads other than the dedicated OS-kernel-level thread writes said predetermined value in a respective one of said predetermined memory locations; and when the dedicated OS-kernel-level thread reads said predetermined value from each of said predetermined memory locations, the dedicated OS-kernel-level thread exits said active waiting state and performs another iteration of said step D) or ends the simulation.

7. The method according to claim 1 wherein kernel resources shared between a plurality of OS-kernel-level threads are duplicated so that each OS-kernel-level thread has a private access to said resources.

8. The method according to claim 1, performed using SystemC.

9. The method according to claim 8 wherein said step C) comprises, for each of said OS-kernel-level threads other than the dedicated OS-kernel-level thread:

performing successive evaluation of SystemC (SC) Method processes; and then performing cooperative evaluation of SC Thread processes.

10. A computer program product including a hardware description Application Program Interface and a Discrete Event Simulation kernel adapted for carrying out a method according to claim 1.

* * * * *